United States Patent [19]

Vuillamy et al.

[11] Patent Number: 5,438,834
[45] Date of Patent: Aug. 8, 1995

[54] CLOSE COMBUSTION GAS GENERATOR

[75] Inventors: Didier Vuillamy, Quincampoix; Etienne Tiret, La Chapelle Reanville; André Beurain, Chambly, all of France

[73] Assignee: Societe Europeenne de Propulsion, Suresnes, France

[21] Appl. No.: 170,819

[22] Filed: Dec. 21, 1993

[30] Foreign Application Priority Data

Dec. 24, 1992 [FR] France .................. 92 15719

[51] Int. Cl.$^6$ .................................. F23R 3/36
[52] U.S. Cl. ........................ 60/753; 60/754; 431/242
[58] Field of Search ............ 60/753, 754, 39.463, 60/39.465, 267; 431/242, 243

[56] References Cited

U.S. PATENT DOCUMENTS

| | | |
|---|---|---|
| 2,405,785 | 8/1946 | Goddard . |
| 2,487,435 | 11/1949 | Goddard . |
| 2,698,514 | 1/1955 | Hull et al. . |
| 3,242,670 | 3/1966 | Buswell . |
| 3,516,254 | 6/1970 | Hammond .............. 60/267 |
| 3,551,085 | 12/1970 | Desty et al. ............ 431/243 |
| 3,608,833 | 9/1971 | Hankins et al. . |
| 3,623,329 | 11/1971 | Abild ..................... 60/267 |
| 4,214,439 | 7/1980 | Browning et al. ......... 60/39.463 |
| 4,377,067 | 3/1983 | Sternfeld et al. ........ 60/39.55 |

FOREIGN PATENT DOCUMENTS

| | | | |
|---|---|---|---|
| 2253843 | 5/1973 | Germany ............ 60/754 |
| 0138608 | 10/1981 | Japan ................ 431/243 |
| 0228225 | 10/1986 | Japan ................ 60/753 |
| 1813975 | 5/1993 | Russian Federation ...... 431/242 |
| 815596 | 7/1959 | United Kingdom . |
| 1046909 | 10/1966 | United Kingdom . |

*Primary Examiner*—Timothy S. Thorpe
*Attorney, Agent, or Firm*—Bacon & Thomas

[57] ABSTRACT

The gas generator comprises an annular main porous piece, at least one calibration lining for defining a flow rate of a first liquid propellant component that is injected through the porous piece towards a combustion chamber that is delimited by one of the faces of the porous piece, and means for radially injecting a flow of a second propellant component into the immediate proximity of the face of the porous piece that delimits the combustion chamber in such a manner as to cause the first and second propellant components to be mixed in the immediate proximity of the face of the porous piece that delimits the combustion chamber.

17 Claims, 3 Drawing Sheets

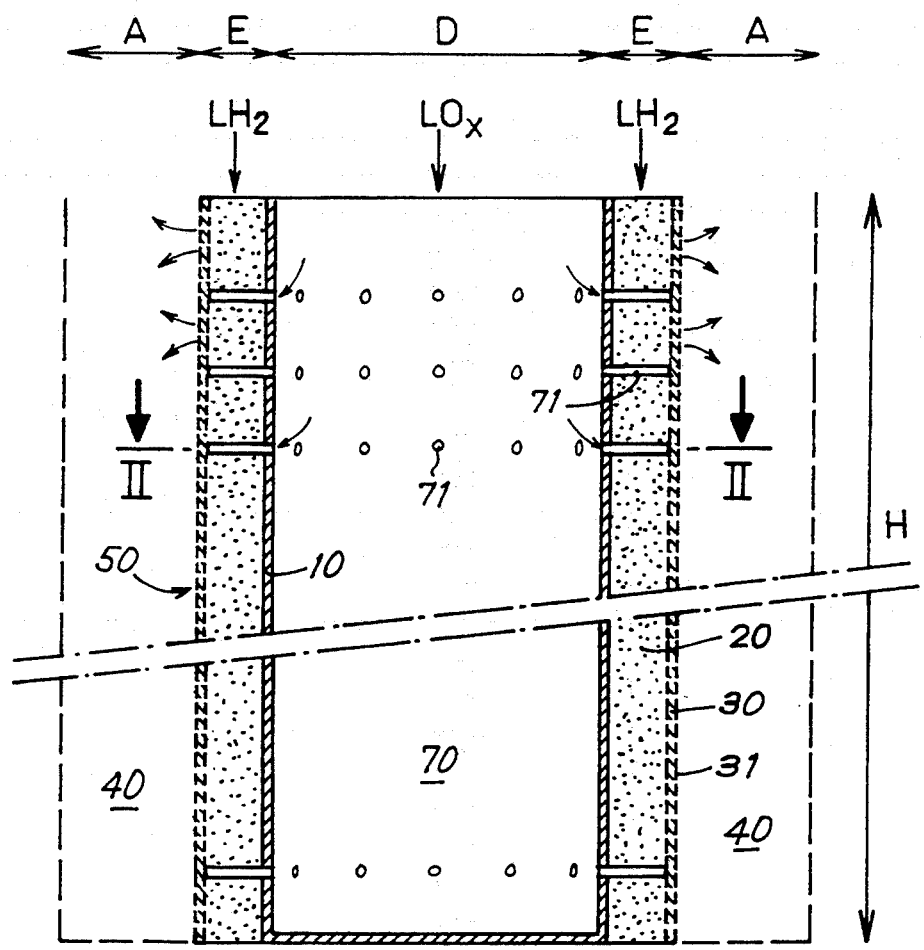
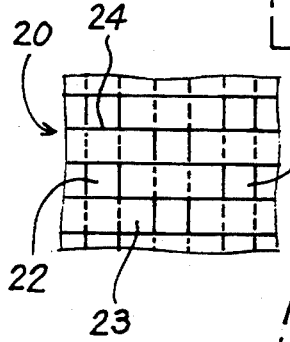
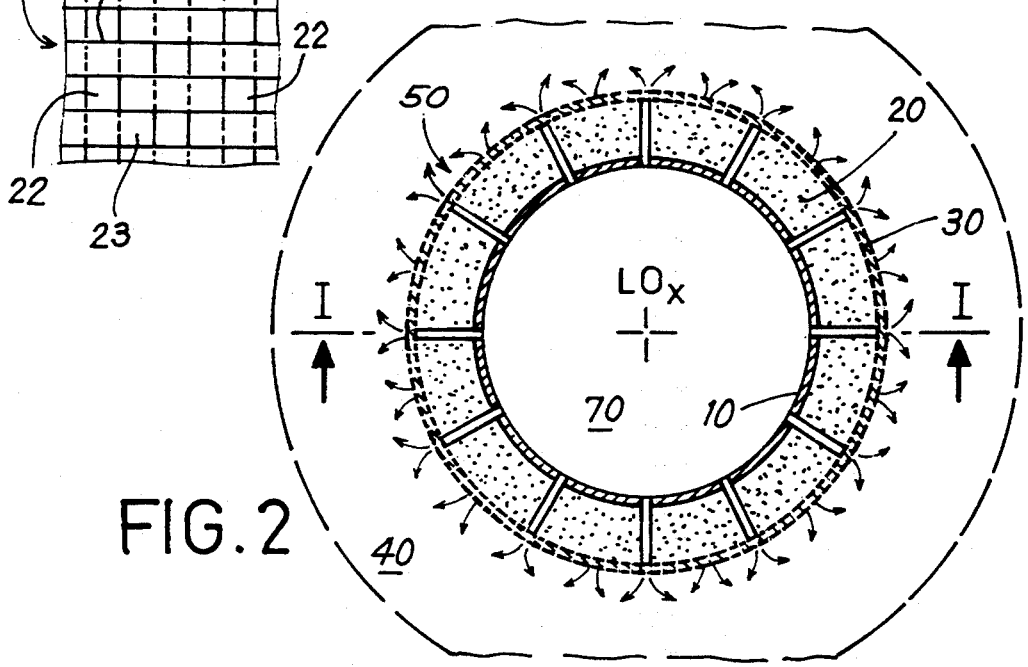

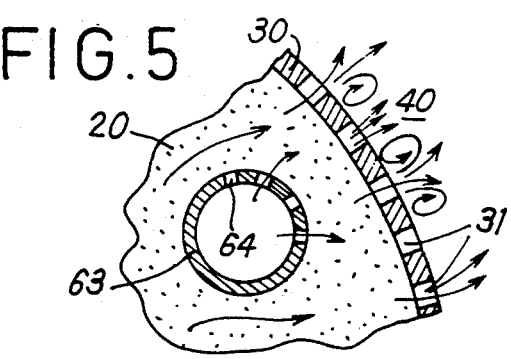
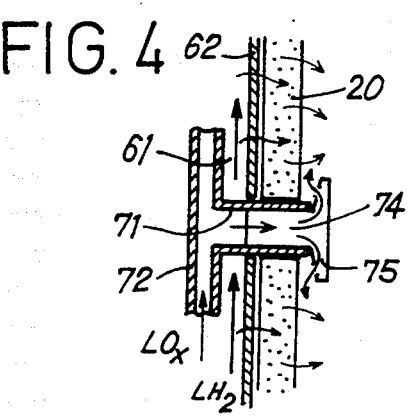
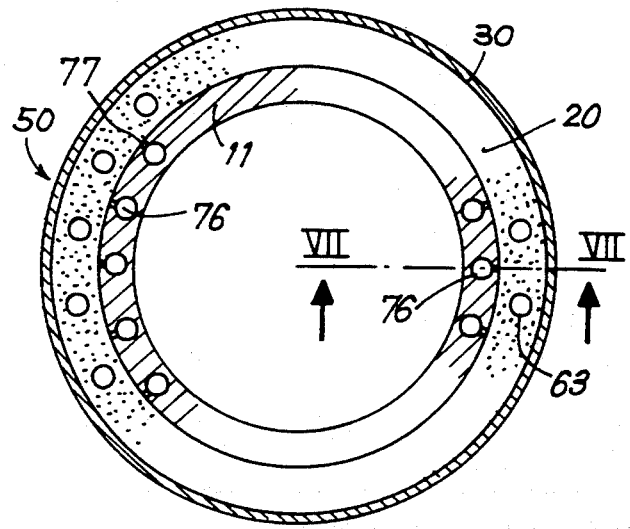
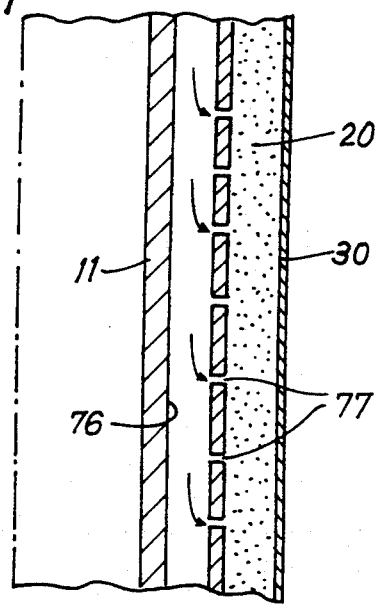
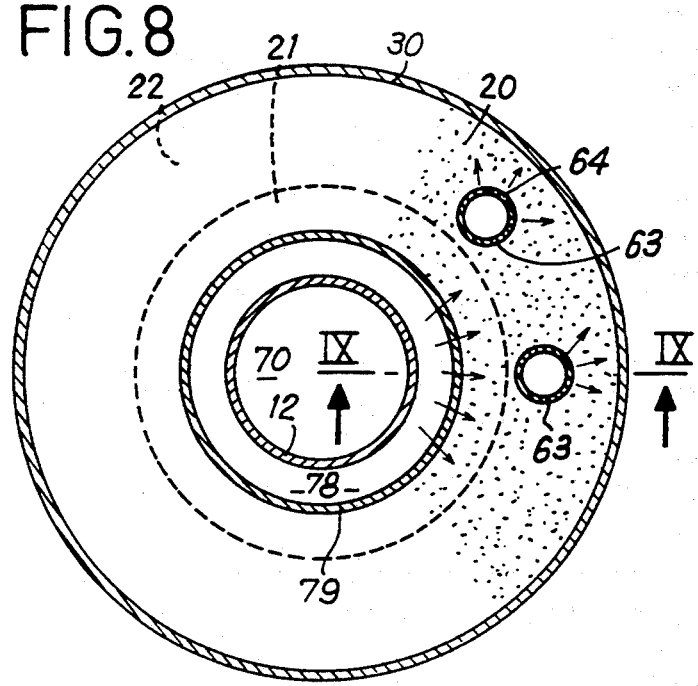
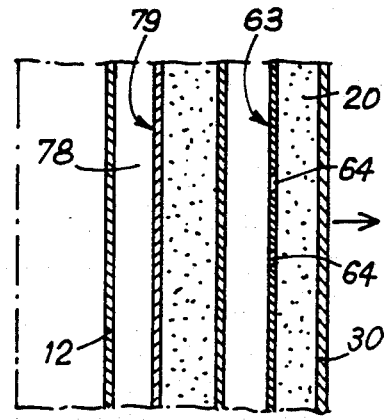

CLOSE COMBUSTION GAS GENERATOR

FIELD OF THE INVENTION

The present invention relates to a close combustion gas generator comprising means for feeding it with a first liquid propellant component and means for feeding it with a second liquid propellant component.

The invention is applicable to all fields in which there is a need to produce a flow of hot gases by means of a compact assembly. This applies, for example, to space applications where a gas generator is used for driving the turbines of turbopumps.

PRIOR ART

Various types of gas generator are already known, in particular gas generators using coaxial injectors that make it possible, on injection into a combustion chamber, to achieve a mixture of propellant components comprising a fuel and an oxidizer. Nevertheless, known gas generators require a combustion chamber to be of relatively large dimensions because the mixture of propellant components is projected relatively far from the injection plate in which the injectors are placed.

The mixing of the propellant components is not always sufficiently uniform.

OBJECT AND BRIEF SUMMARY OF THE INVENTION

The invention seeks to remedy the above-specified drawbacks and to enable a gas generator of small size to be made in simple manner, in which the propellant components can be mixed in uniform and stable manner at a short distance from the wall carrying the injection means, even at high rates of injection, and which avoids the use of conventional injectors.

These objects are achieved by a close combustion gas generator comprising means for feeding a first liquid propellant component and means for feeding a second liquid propellant component, a main porous piece through which a flow of the first liquid propellant component is injected towards a combustion chamber delimited by one of the faces of the porous piece, and means for injecting a flow of the second propellant component into the porous piece or the immediate proximity of the face of the porous piece that delimits the combustion chamber in such a manner as to cause the first and second propellant components to mix in the porous piece or the immediate proximity of said face of the porous piece that delimits the combustion chamber, wherein the main porous piece is annular in shape, wherein said means for injecting a flow of the second propellant component are shaped so as to cause the second fuel component to be injected essentially radially, wherein at least one calibration lining is associated with the main porous piece, and wherein the calibration lining comprises calibration orifices for modulating the injection speed of the first liquid propellant component into the combustion chamber, at least one of the parameters comprising the sizes of the calibration orifices, the distances between adjacent calibration orifices, and the number of calibration orifices per unit area varying as a function of the axial positions of the calibration orifices in the calibration lining.

In a first possible embodiment, the means for radially injecting a flow of the second propellant component open out into the combustion chamber on the outside of the porous piece.

In which case, the two propellant components are mixed together inside the combustion chamber, outside the porous piece, but in the immediate proximity thereof.

In a particular embodiment, the means for radially injecting the second propellant component comprise a plurality of radial tubes passing right through the porous piece and distributed over the entire height and the entire periphery of the generator.

Advantageously, the tubes are attached to a reinforcing structure pressed against the face of the porous piece opposite from its face delimiting the combustion chamber.

The radial tubes may be fed from an annular feed chamber extending up the entire height of the generator, or else from a plurality of feed ducts extending over the entire height of the generator.

In a particular embodiment, inserts are mounted inside the radial tubes and are extended by flared portions inside the combustion chamber in such a manner as to cause the second propellant component to be injected in the form of a sheet that is substantially parallel to the porous piece.

The invention also relates to another embodiment in which the means for radially injecting a flow of the second propellant component open out into the porous piece.

In which case, the two propellant components are mixed together within the porous piece itself, in the vicinity of the combustion chamber, prior to the components being injected into the chamber, which contributes to improving the uniformity of mixing and encourages combustion very close to the porous piece.

By way of example, the means for radially injecting a flow of the second propellant component comprise an annular cavity which is situated on the side of the porous piece opposite from its side delimiting the combustion chamber, extending up the entire height of the generator and defined on its side that is in contact with the porous piece by means of a calibration lining enabling the second propellant component to be injected directly into the porous piece.

In another embodiment, the means for radially injecting a flow of the second propellant component comprise longitudinal passages formed in a solid part that extends along the side of the porous piece opposite from its side delimiting the combustion chamber and up the entire height of the generator, and that open out into the porous piece via calibrated radial passages.

In all cases, the gas generator advantageously comprises a calibration lining placed on that face of the porous piece that is situated on the same side as the combustion chamber.

In a particular embodiment, at the end zone of the calibration lining constituting the head of the generator, the calibration orifices are designed so as to define small propellant component flow rates to create a pilot flame.

Nevertheless, in certain embodiments, the generator may also include a calibration lining placed on the face of the porous piece that faces away from the combustion chamber.

In a particular embodiment, the first propellant component is injected into the porous piece via longitudinal ducts each delimited, at least in its portion facing towards the combustion chamber, by a calibration lining.

The porous piece may be made up of a set of sheets of interlaced strips. In which case, a calibration lining is implemented by plugging some of the orifices formed at the intersections between the interlaced strips.

In another possible embodiment, the porous piece is made from metal balls that are compressed by hot isostatic compression.

The annular porous piece is advantageously essentially cylindrical or frustoconical in shape.

The combustion chamber may be annular and outside the annular porous piece, or it may be central and inside the annular porous piece.

BRIEF DESCRIPTION OF THE DRAWINGS

Other characteristics and advantages of the invention appear from the following description of particular embodiments given as non-limiting examples, and made with reference to the accompanying drawings, in which:

FIG. 1 is an axial section view through a first embodiment of a close combustion gas generator of the invention, incorporating an annular porous piece;

FIG. 2 is a section in a radial plane on line II—II of FIG. 1;

FIG. 3 is a detail view showing an embodiment of the porous piece incorporated in the gas generator of the invention;

FIG. 4 is a detail view in section on an axial plane showing one possible embodiment of means for injecting one of the propellant components in the form of a sheet into the combustion chamber of a gas generator of the invention;

FIG. 5 is a detail view in section on a radial plane showing a possible embodiment of means for injecting a propellant component into the porous piece incorporated in the gas generator of the invention;

FIG. 6 is a section view on a radial plane through a second embodiment of a gas generator of the invention, in which two different propellant components are injected into the porous piece incorporated in the gas generator;

FIG. 7 is a fragmentary axial section view on line VII—VII of FIG. 6;

FIG. 8 is a section view on a radial plane showing yet another example of a gas generator of the invention, in which two different propellant components are injected into the porous piece incorporated in the gas generator;

FIG. 9 is a fragmentary axial section view on line IX—IX of FIG. 8;

DETAILED DESCRIPTION OF PARTICULAR EMBODIMENTS

Figure 10:
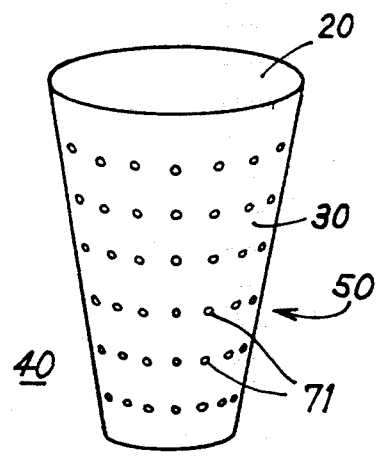
FIG. 10 is a diagrammatic elevation view showing a possible shape for the gas generator of the invention.

With reference to FIGS. 1 and 2, there can be seen the overall design of an example of a close combustion gas generator 50 of the invention serving to deliver gas radially into an outer annular space 40 of small width A.

The major portion of the description is given with reference to a gas generator having an annular combustion chamber 40 that is external, but the invention is equally applicable to a gas generator 150 including a central combustion chamber 140, as described below with reference to FIG. 11.

The gas generator of the invention is essentially designed for achieving very rapid combustion of first and second liquid propellant components that may be constituted, for example, respectively by a fuel such as liquid hydrogen and by an oxidizer such as liquid oxygen.

The gas generator 50 essentially comprises an annular main porous piece 20 which may be cylindrical in shape (FIG. 1) or frustoconical (FIG. 10).

The porous piece 20 serves to avoid the use of conventional individual injectors that are long, and to make it possible to apply propellant components at significant flow rates into the combustion chamber 40, with at least one of the propellant components being injected by sweating through the porous piece 20 which defines a wall of limited thickness E that gives rise to very low head losses. The porous piece 20 is provided with at least one calibration lining which serves to calibrate the flow rate of the propellant component that passes through said piece and that contributes to stabilizing combustion.

The porous piece 20 may be made in various different ways, and its porosity may be in the range 20% to 40%, for example.

In one particular possible embodiment, the porous piece 20 is made of metal beads that have been compressed by hot isostatic compression.

In another particular embodiment, the porous piece 20 is made of composite material having a carbon or a ceramic matrix.

FIG. 3 is an outside view of a portion of a porous piece 20 that is made up of a set of sheets of interlaced strips 22 and 23 which may be assembled together by weaving. In which case, it is possible to avoid using a separate calibration lining since calibration can be achieved by plugging some of the orifices 24 formed at the intersections of the interlaced strips 22 and 23 on the external surfaces of the porous piece 20.

With reference again to FIGS. 1 and 2, there can be seen a cylindrical gas generator 50 of height H having a central cavity 70 of diameter D suitable for use in feeding e.g. the second propellant component which may be injected from said central cavity 70 directly into the peripheral combustion chamber 40 while the first propellant component is injected through the porous piece 20 fitted with a calibration lining.

In FIGS. 1 and 2, there can be seen a cylindrical reinforcing structure 10 (e.g. made of metal) defining the central cavity 70 and pressed against the face of the porous piece 20 which is opposite to its face defining the combustion chamber 40.

A plurality of radial tubes 71 pass through the cylindrical reinforcing structure 10, the porous piece 20, and the calibration lining 30 that is placed on the face of the porous piece 20 that defines the combustion chamber 40. The tubes 71 are distributed all around the gas generator 50 and over its entire height.

While the generator is being manufactured, it is possible to begin by making the cylindrical reinforcing structure 10, then to fix the tubes 71 on said reinforcing structure 10 so as to constitute a "hedgehog" type structure, and then to form the porous piece 20 and the lining 30 with its calibration orifices 31 on the reinforcing structure 10 in the gaps between the tubes 71.

In another possible method of manufacture, the porous piece 20 is made first, then the calibration lining 30 and the reinforcing structure 10 which may be formed by being deposited on the external and internal faces of the porous piece 20, or the reinforcing structure 10 may be made first and, after piercing radial holes through the complex wall formed by the reinforcing structure 10, the porous piece 20, and the calibration lining 30, the tubes 71 are inserted in the radial holes and the tubes 71 are secured to the reinforcing structure 10, e.g. by brazing, crimping, or screwing. This method in which the radial holes are made and the tubes are installed in parts that are already assembled together makes it possible to avoid problems of misalignment that can arise if the radial holes are previously formed in parts while they are still independent. The radial holes are formed through the complex wall along successive generator lines.

In the embodiment of FIGS. 1 and 2, one of the propellant components, e.g. liquid hydrogen, is injected into the porous piece 20 through which it migrates into the external annular combustion chamber 40, exiting radially through the entire external peripheral surface of the porous piece 20 through the orifices 31 in the reinforcing and calibration lining 30. The other propellant component, such as liquid oxygen, is delivered to the central cavity 70 from which it is injected radially via the tubes 71, passing directly into the combustion chamber 40, but in the immediate proximity of the external face of the porous piece 20 so as to cause the propellant components to be mixed in the immediate proximity of the porous piece 20, thereby ensuring close combustion, thus making it possible to retain relatively small dimensions for the gas generator assembly 50.

The porous piece 20 through which the first propellent component migrates is preferably of a thickness E that is not less than 5 mm.

By way of example, the combustion chamber 40 may have a width in the radial direction A lying in the range 20 mm to 50 mm.

The invention makes it easy to implement a gas generator of height H lying in the range 40 mm to 120 mm, with a porous piece 20 of mean inside diameter D lying in the range 60 mm to 100 mm.

In contrast, a conventional type of gas generator fitted with an injection plate having coaxial injectors and providing equivalent performance needs to have a height that is greater than about 200 mm and a diameter that is not less than about 180 mm.

Occupying space in the radial direction that is not greater than that occupied by a conventional gas generator, a gas generator of the invention makes it possible to divide the height H by two.

By way of example, for a gas generator 50 of height H equal to 100 mm, the speed at which the liquid oxygen is ejected through the tubes 71 may be of the order of 6 meters per second (m/s) if the number of tubes 71 is of the order of 120 and if the inside diameter of said tubes is 2.4 mm, for example.

The outlet speed of a fuel such as liquid hydrogen passing through the porous wall 20 that is about 5 mm thick depends on the delivery area, and thus on the porosity of the material. For a porosity of the order of 40%, the outlet speed of the liquid propellant component passing through the porous piece 20 is of the order of 5 m/s whereas for porosity of the order of 20%, the outlet speed of the liquid propellant component is of the order of 10 m/s. This gives rise to zones in which the components mix and burn that extend over 50 mm to 100 mm. It is thus possible to obtain a flame over a very short distance.

To take account of the size of the combustion zone both in the radial direction and in the axial direction, it may be advantageous in some applications to make the porous piece 20 with a frustoconical shape, as shown in FIG. 10, with its smaller section being in the downstream portion and having a small number of tubes 71 while the combustion chamber 40 may itself be larger in its downstream portion, with the outside of the hot gas production zone itself being more or less cylindrical.

In general, because the components injected through the porous piece 20 are capable of being injected into the combustion chamber 40 at significant flow rates and at delivery speeds of the order of only a few meters per second, it is possible to obtain a flame that is short, i.e. combustion that is close to the porous piece 20, thereby making it possible to make a gas generator that is compact.

Numerous variant embodiments are possible. Thus, FIG. 4 shows the implementation of hollow inserts 74 which are disposed inside the tubes 71 for passing the second component, and which extend inside the combustion chamber 40 in the form of flared portions 75 provided with orifices directed towards the porous piece 20 so as to direct injection of the second component, e.g. liquid oxygen, in the form of a sheet that is substantially parallel to the porous piece 20, thereby reducing the radial penetration distance of the component that is injected into the combustion chamber 40 via the tubes 71.

The tubes 71 may be of various different sections other than circular, for example they may be rectangular in section or otherwise.

The first component, e.g. liquid hydrogen, may be fed into the porous piece 20 in various different ways.

In FIG. 5, there can be seen a longitudinal duct 63 that may extend over the entire height of the porous piece 20 and that is fed with propellant component from its top end. The duct 63 is delimited, at least in its portion facing towards the combustion chamber 40, by a wall that has orifices 64 that form a calibration lining. A set of such longitudinal ducts 63 can thus be distributed within the porous piece 20 in such a manner as to enable the first component to migrate towards the combustion chamber 40 over the entire periphery and over the entire height of the porous piece 20. The outer calibration lining 30 then serves essentially to provide mechanical reinforcement, playing a secondary role only in defining the flow rate of the first propellant component.

The tubes 71 may be fed with propellant from an annular feed chamber 72 disposed inside the central cavity 70 and extending along the entire height thereof (FIG. 4) or via a series of feed ducts extending over the entire height of the gas generator. The tubes 71 may then be constituted by small radial ducts connected to the feed ducts or to the annular feed chamber 72.

The annular chamber 72 may be placed at a small distance behind the inside face of the porous piece 20, inside the central cavity 70, so as to leave an annular space 61 through which the first propellant component can be fed, and enabling said component to be injected into the porous piece 20 through a calibration lining 62 placed on the inside face of the porous piece 20, i.e. its face opposite to its face defining the combustion chamber 40. The first propellant component may also be injected into the porous piece 20 by means, inter alia, of ducts 63 incorporated in said piece.

So far, the embodiments described have the first propellant component injected from the inside of the porous piece 20, while the second component passes through the porous piece 20 via tubes 71 or the like so as to be injected separately into the combustion chamber 40, with the components then mixing in the vicinity of the porous piece 20, but actually inside the combustion chamber 40.

Nevertheless, the invention also relates to embodiments in which the components mix inside the porous piece 20 itself, even before they are injected into the combustion chamber 40. This contributes to obtaining a uniform mixture of the propellant components.

In a particular embodiment shown in FIGS. 6 and 7, the second component, e.g. the oxidizer, arrives via the innermost portion of the gas generator and is conveyed by a set of pipes 76 formed in a solid ring 11 that may be made of metal. Orifices 77 are formed along the pipes 76 which extend essentially in the longitudinal direction of the generator. The orifices 77 are made in those portions of the pipes 76 that face the porous piece 20 so as to enable the second component to flow towards the periphery of the generator through the porous piece 20. The first component, e.g. the fuel, is itself injected into the porous piece 20, e.g. via pipes 63 which likewise essentially extend in the longitudinal direction of the generator, and each of which, at least in its portion facing the combustion chamber 40, has a calibration lining pierced by orifices 64 that enable the propellant component to pass into the porous piece 20 over the entire height of said porous piece 20. The pipes 63 can thus be made in the manner described with reference to FIG. 5. A calibration lining 30 is advantageously disposed on the external face of the porous piece 20 that defines the combustion chamber 40, thereby improving the mechanical strength of the porous piece 20 through which the pipes 63 pass, while also contributing to modulating the speed at which the propellant components are injected and to providing eddy zones close to the wall of the combustion chamber.

FIGS. 8 and 9 show another embodiment in which the propellant components are mixed within the porous piece 20. In this particular embodiment, an annular cavity 78 situated in the central cavity 70, i.e. on the side opposite to the side defining the combustion chamber 40, extends overt the entire height of the generator and is defined firstly internally by a solid wall 12 and secondly by a calibration lining 79 on that side of the annular cavity 78 which is in contact with the annular porous piece 20 so as to enable the second propellant component to be injected directly into the porous piece 20. The first propellant component may itself be injected into the porous piece 20 via longitudinal pipes 63 provided around a fraction of their peripheries with respective calibration linings pierced by holes 64 as described above with reference to FIGS. 5 and 6. An outer calibration lining 30 surrounds the porous piece 20 as shown in FIG. 5, for example.

In a variant embodiment, the second propellant component could be injected into the porous piece 20 by means of a series of longitudinal pipes analogous to the pipes 63 and located in the porous piece 20 in the vicinity of the pipes 63, but somewhat more internally, and having holes distributed in all directions. The porous piece 20 may also be constituted by two juxtaposed concentric rings 21 and 22 represented by dashed lines in FIG. 8. In this case, the inner ring of porous material 21 has only one of the propellant components passing through it, e.g. the oxidizer, whereas the other component, e.g. the fuel, is injected into the outer ring of porous material 22 in which uniform mixing of the two components passing through the outer ring 22 take place prior to the components exiting radially into the combustion chamber 40. Under defined conditions of pressure and temperature, and for the length of time taken by the mixture to pass through the porous piece 20, the mixture of propellant components is stable.

The description above relates to embodiments of a gas generator 50 having an outer annular combustion chamber 40. Nevertheless, the various embodiments described could be adapted to gas generators having a central combustion chamber, with the propellant components being injected radially from the outside inwards through the annular porous piece which performs exactly the same function as for a gas generator having an external combustion chamber.

Figure 11:
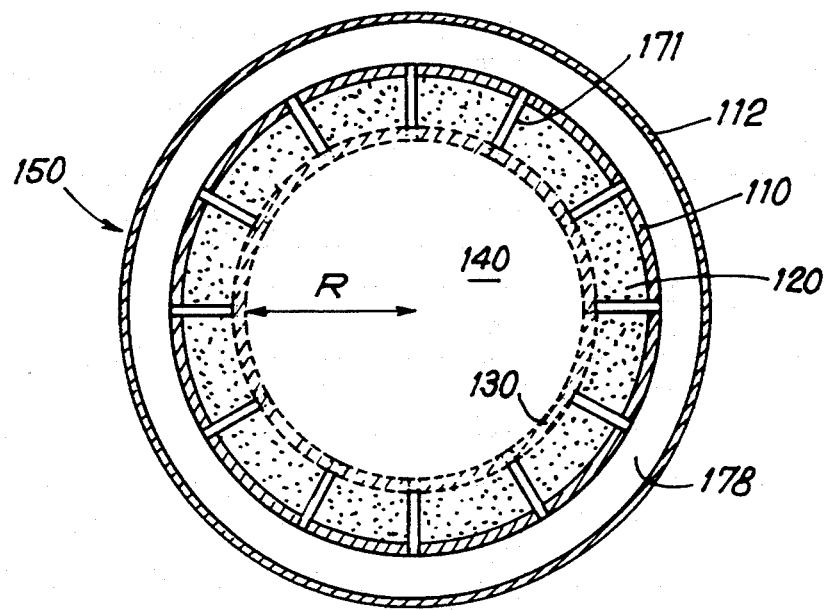
FIG. 11 is a section view on a radial plane through an embodiment of a gas generator of the invention with a central combustion chamber.

FIG. 11 shows an example of such a close combustion gas generator 150 having a central combustion chamber 140 whose radius R may lie in the range 20 mm to 50 mm, for a generator whose height may lie in the range 50 mm to 100 mm, for example.

An outer annular enclosure 178 is defined by a continuous external cylindrical wall 112 and by an internal cylindrical wall 110 that is continuous with the exception of radial through orifices receiving tubes 171. An oxidizer propellant component such as liquid oxygen is delivered to the external annular cavity 178 so as to be injected radially into the central combustion chamber 140 via the tubes 171 which may be entirely similar to the above-described tubes 71. The fuel component may be fed to the annular porous piece 120 which is sandwiched between the cylindrical wall 110 and a calibration lining 130 which may itself be entirely similar to the reinforcement and calibration lining 130 as described above. In the example of FIG. 11, the components mix in the central combustion chamber 140 in the vicinity of the calibration lining 130, in a manner analogous to the embodiment of FIGS. 1 and 2. Nevertheless, a central combustion chamber embodiment could also be implemented in which the components mix within the porous piece 120 in a manner analogous to that described with reference to FIGS. 6, 7 and 8, 9.

It will be observed that the various embodiments described above are all simple to implement because of the one-piece nature of its component parts. Thus, the annular porous piece 20, 120, is a single piece or is at most constituted by two concentric one-piece rings 21, 22 (FIG. 8). The calibration linings 30, 130, 79, 62, 63 are tubular in shape and easy to make. Similarly, the propellant component feed means 71, 72, 76, 171 are all essentially tubular in shape.

The particular structure of the gas generator of the invention lends itself to assembly by fitting successive parts one within another, thereby providing ease of assembly and increasing reproducibility while reducing cost and increasing the accuracy of the result obtained. In particular, performing assembly by fitting successive parts one within another makes it possible to test each part during assembly and, where necessary, to adapt subsequently-fitted parts. It also makes it possible in advance to provide certain parts in pairs, thereby rationalizing production and increasing reproducibility.

The holes to be formed through the porous piece 20 or 120 may be made using the electro-erosion technique. The holes that run parallel to the axis of circular symmetry of the generator may be made simultaneously (FIGS. 5, 6, and 8). The radial holes may be made along successive generator lines (FIGS. 1, 2, 4, 11).

The orifices 64 and 76 formed in metal parts may be made by conventional drilling techniques using drill bits.

In the embodiment shown in FIGS. 1 and 2, the radial tubes 71 are inserted after holes have been formed in the porous piece 20 already fitted with its reinforcement and calibration linings 10, 30. This ensures that the radial holes formed in the three parts 10, 20, and 30 are in good alignment.

For embodiments such as those shown in FIGS. 5, 6, and 8, it may be advantageous to begin by placing the outer and inner linings 30 and 79, 11 on the outer and inner faces of the porous piece 20, and then insert the pipes 63 in holes that have previously been formed parallel to the axis of symmetry of the gas generator. An example of the method for installing the pipes 63 is as follows: the porous piece 20 provided with its holes parallel to its axis of symmetry is raised to a high temperature, e.g. 300° C. to 400° C. This heating may be implemented by immersing the porous piece 20 in a bath of oil, or by means of eddy current heating, using varying magnetic fields. The pipes 63 to be inserted in the porous piece 20 are themselves taken to low temperature and then inserted into the holes formed in the porous piece 20. After the pipes 63 have been installed, and once the porous piece 20 has returned to ambient temperature, the pipes are rigidly held in place inside the porous piece 20 and are capable of behaving well, even in the presence of external sources of vibration.

The propellant component feed pipes such as the pipes 63 may be fed simply from a toroidal manifold into which the ends of the pipes 63 penetrate. Sealing at the points of contact between the pipes 63 and such a toroidal manifold may be provided by brazing, for example.

Functionally, it may be observed that in a uniform mixture of the kind that is to be made in the context of the present invention by using propellant components that are injected into the porous material or into the immediate proximity thereof, combustion propagates at a constant speed defining a domain of unburnt propellant ("fresh" gas) and a domain of burnt gas. The flame front delimiting the two above-specified domains moves relative to the fresh gas at a speed that depends on the nature of said fresh gas, and also on the conditions of temperature, pressure, mixing ratio, and titer of the reagents.

If the speed of advance of the cold gas exceeds that of the flame front, then the flame moves towards the burnt gas domain and may leave the combustion chamber. Under such circumstances, combustion is extinguished in the chamber of a rocket engine and propulsion is no longer possible.

The invention seeks to reduce sensitivity to extinction to a considerable extent.

The propellant mixture used, in particular the pair liquid oxygen and liquid hydrogen possesses the property of having a combustion speed that is very high, such that the flame is always trying to stick to the wall through which the propellant is being delivered and it adheres to the two-phase mixture created at a short distance from the wall by the association of gas and of droplets in the process of vaporizing and of burning.

The liquid fraction, constituted by liquid oxygen and hydrogen intimately mixed together appears in the form of a cloud of droplets which, on passing through the flame adjacent to the wall surrounds itself in flame.

The propagation speed of the flame depends on the temperature of the gas mixture, and on the pressure and the ratio of the mixture. The flame that is created must remain at a very small distance from the wall but without actually sticking thereto.

The existence of a calibration lining 30, 130 on the combustion chamber side is essential insofar as, in addition to increasing the mechanical strength of the porous material, said calibration lining also makes it possible:
to modulate the injection speed; and
to provide eddy zones close to the wall suitable for maintaining combustion.

It will be understood that by restricting the outlet openings of the porous piece by the calibration orifices 31 at a given flow rate, the ejection speed of the propellant components is increased, i.e. the flame is pushed further away (and its shape is changed). This thus makes it possible to provide a second means for controlling the position of the flame, the first control means being constituted by the injection temperature of the propellant components.

Furthermore, the presence of a calibration lining 30 guarantees that an eddy zone of hot gases will be created in the gap between two adjacent jets through the orifices 31, thereby maintaining combustion and ensuring adherence of the flame (see FIG. 5).

Combustion stability is provided by an appropriate choice at each level of the gas generator for the size of the calibration orifices 31, for the distance between adjacent calibration orifices 31, and for the density of such orifices (number of orifices per unit area). These parameters can thus be varied as a function of height relative to an end of the gas generator that constitutes the head of the generator.

For example, the presence of a flame in the gas generator can be guarantee by creating a pilot flame in the generator head, said pilot flame communicating combustion to the remainder of the chamber in the generator. The pilot flame is created by very low flow rates of propellant components through the generator head. Thus, a source of hot gas remains continuously in existence upstream from the flow ready to propagate combustion when said hot gases move in the combustion chamber.

We claim:

1. A compact gas generator comprising:
a porous, annularly shaped piece having an associated, axially extending longitudinal axis, said porous piece having a first peripheral face constituting an inlet and a second, opposing peripheral face constituting an injection face;
a combustion chamber defined, at least in part, by said injection face, said combustion chamber having associated therewith at least one flame that is located directly adjacent said injection face;
means for feeding a first liquid propellant component axially into said porous piece;
means at said inlet of said porous piece for injecting essentially radially with respect to said longitudinal axis a flow of a second liquid propellant component into the porous piece in such a manner as to cause the first and second liquid propellant components to mix in the porous piece; and
a calibration lining on said injection face serving to inject radially with respect to said longitudinal axis a mixture of said first and second liquid propellant components into the combustion chamber, said calibration lining including a plurality of calibration orifices for modulating the injection speed of said mixture of said first and second liquid propellant components into the combustion chamber where they are ignited adjacent said calibration lining and produce combustion gases within the combustion chamber, which combustion gases flow from said combustion chamber in a direction substantially parallel to said longitudinal axis.

2. A gas generator according to claim 1, wherein said first and second peripheral faces of said porous piece are cylindrical in shape and concentric about said longitudinal axis.

3. A gas generator according to claim 1, wherein said first and second peripheral faces of said annularly shaped porous piece define truncated conical surfaces.

4. A gas generator according to claim 1, wherein said means for injecting essentially radially a flow of the second propellant component opens at one end thereof into said inlet and at another end thereof into the porous piece.

5. A gas generator according to claim 4, wherein the means for injecting essentially radially a flow of the second propellant component comprises an annular cavity which is radially spaced from said injection face and extends longitudinally a distance corresponding to the height of the gas generator, said gas generator further comprising a distribution lining located at a side of said annular cavity that is in contact with the porous piece, said distribution lining enabling the second propellant component to be injected directly into the porous piece.

6. A gas generator according to claim 4, wherein the means for injecting essentially radially a flow of the second propellant component comprises an injection member that extends coaxial with the porous piece opposite said injection face, said injection member including a plurality of longitudinal passages that open out into the porous piece via calibrated radial passages.

7. A generator according to claim 1, wherein the first propellant component is injected into the porous piece via longitudinal ducts each defined, at least in part, by a distribution lining.

8. A generator according to claim 1, wherein the porous piece is made of a set of sheets of interlaced strips, and wherein said calibration lining is formed by plugging some of the orifices formed at intersections of the interlaced strips.

9. A gas generator according to claim 1, wherein the porous piece comprises a composite material having at least one of a carbon and a ceramic matrix.

10. A gas generator according to claim 1, wherein the porous piece comprises thermally isostatically compressed metal balls.

11. A gas generator according to claim 1, wherein said combustion chamber is annularly and outwardly radially spaced from said porous piece.

12. A gas generator according to claim 1, wherein said combustion chamber is located radially inwardly of said porous piece.

13. A gas generator according to claim 1, wherein said porous piece has a corresponding thickness at least 5 mm.

14. A gas generator according to claim 1, wherein the gas generator has an associated height that lies in the range of 40 mm to 120 mm.

15. A gas generator according to claim 1, wherein the porous piece has a mean inside diameter lying in the range of 60 mm to 100 mm.

16. A gas generator according to claim 1, wherein the combustion chamber has a width, in the radial direction, that lies in the range of 20 mm to 50 mm.

17. A gas generator according to claim 1, wherein the first propellant component is constituted by liquid hydrogen and the second propellant component is constituted by liquid oxygen.

* * * * *